United States Patent [19]

Nagashima

[11] Patent Number: 4,654,970

[45] Date of Patent: Apr. 7, 1987

[54] HEATED HANDLE FOR A CHAIN SAW

[75] Inventor: Akira Nagashima, Kawasaki, Japan

[73] Assignee: Kioritz Corporation, Tokyo, Japan

[21] Appl. No.: 834,510

[22] Filed: Feb. 28, 1986

Related U.S. Application Data

[63] Continuation of Ser. No. 642,890, Aug. 21, 1984, abandoned.

[30] Foreign Application Priority Data

Aug. 26, 1983 [JP] Japan ........................ 58-131841

[51] Int. Cl.$^{4}$ ........................ B23D 57/02; B23D 59/00

[52] U.S. Cl. ........................ 30/383; 16/114 R; 16/116 R; 190/39; 190/117; 219/201

[58] Field of Search ........................ 30/381–387; 16/110 R, 111 R, 116 R, 110.5, DIG. 12, 114 R; 219/201, 204; 222/473, 474; 190/39, 115, 117

[56] References Cited

U.S. PATENT DOCUMENTS 2,835,777 5/1938 Gates et al. ........................ 219/204

3,525,373 8/1970 Kobayashi ........................ 30/381

3,844,360 10/1974 Green et al. ........................ 173/170

FOREIGN PATENT DOCUMENTS 1134548 11/1969 United Kingdom ........................ 190/115

*Primary Examiner*—Douglas D. Watts

*Attorney, Agent, or Firm*—Browdy and Neimark

[57] ABSTRACT

A handle of a portable power-driven machine such as a chain saw has an upper handle member and a lower handle member which are adjoined to each other to present the form of a handle. The handle also has an anti-slip rubber layer lining the outer surface of the lower handle member. The rubber layer has an upper end folded back on the upper ends of both side walls of the lower handle member to overlie the upper inner periphery of the lower handle member. The upper handle member has vertical downward projections which engage the folded end portion of the rubber layer overlying the upper inner periphery of the lower handle member.

5 Claims, 2 Drawing Figures

HEATED HANDLE FOR A CHAIN SAW

This application is a continuation of application Ser. No. 642,890, filed Aug. 21, 1984 now abandoned.

BACKGROUND OF THE INVENTION

The present invention relates to a handle for a portable machine such as a chain saw, grass trimmer or the like.

Portable machines of the kind described usually have a rubber layer wound a round the handle, for the purpose of preventing slippage of a user's hand and of protecting the same from vibration. In particular, machines intended for use in cold districts are equipped with an electric heat generating body disposed between the handle and the rubber layer. In the known machines, the rubber layer and heat generating body are bonded to the handle by means of an adhesive, in order to prevent any slippage or movement on the handle. In consequence, considerable time and labor are required for the assembly, repair and renewal of the rubber layer and the heat generating body. In addition, the rubber layer and the heat generating body are easy to come off during the work.

SUMMARY OF THE INVENTION

Accordingly, an object of the invention is to provide a handle for a portable machine having a simple and easy-to-fabricate construction while obviating the above-described problems of the prior art.

To this end, according to the invention, there is provided a handle for a portable power-driven machine comprising: an upper handle member and a lower handle member which are adjoined to each other to present the form of a handle; and an anti-slip rubber layer lining the outer surface of the lower handle member, the rubber layer having an upper end folded back on the upper ends of the both side walls of the lower handle member to overlie the upper inner periphery of the lower handle member, the upper handle member having vertical downward projections which engage the folded end portion of the rubber layer overlying the upper inner periphery of the lower handle member.

The rubber layer is preferably provided on the extremities thereof overlying the upper inner periphery of the lower handle member with steps which engage the lower ends of the vertical downward projections of the upper handle member.

The upper and lower handle members are adjoined to each other by means of screws.

When the machine is intended for use in cold districts, a heat generating body is interposed between the lower handle member and the rubber layer.

With this arrangement, the rubber layer is stretched as the folded portion thereof is pulled downwardly when the downward vertical projections are forced into the lower handle member, so that the rubber layer can make close and tight contact with the outer surface of the lower handle member without the aid of an adhesive. Consequently, the assembly, repair and replacement of the handle can be effected easily and efficiently. The attaching and detaching of the heat generating body as required are also facilitated advantageously.

These and other objects, features and advantages of the invention will become clear from the following description of the preferred embodiments.

DESCRIPTION OF THE PREFERRED EMBODIMENT

Figures 1, 2:
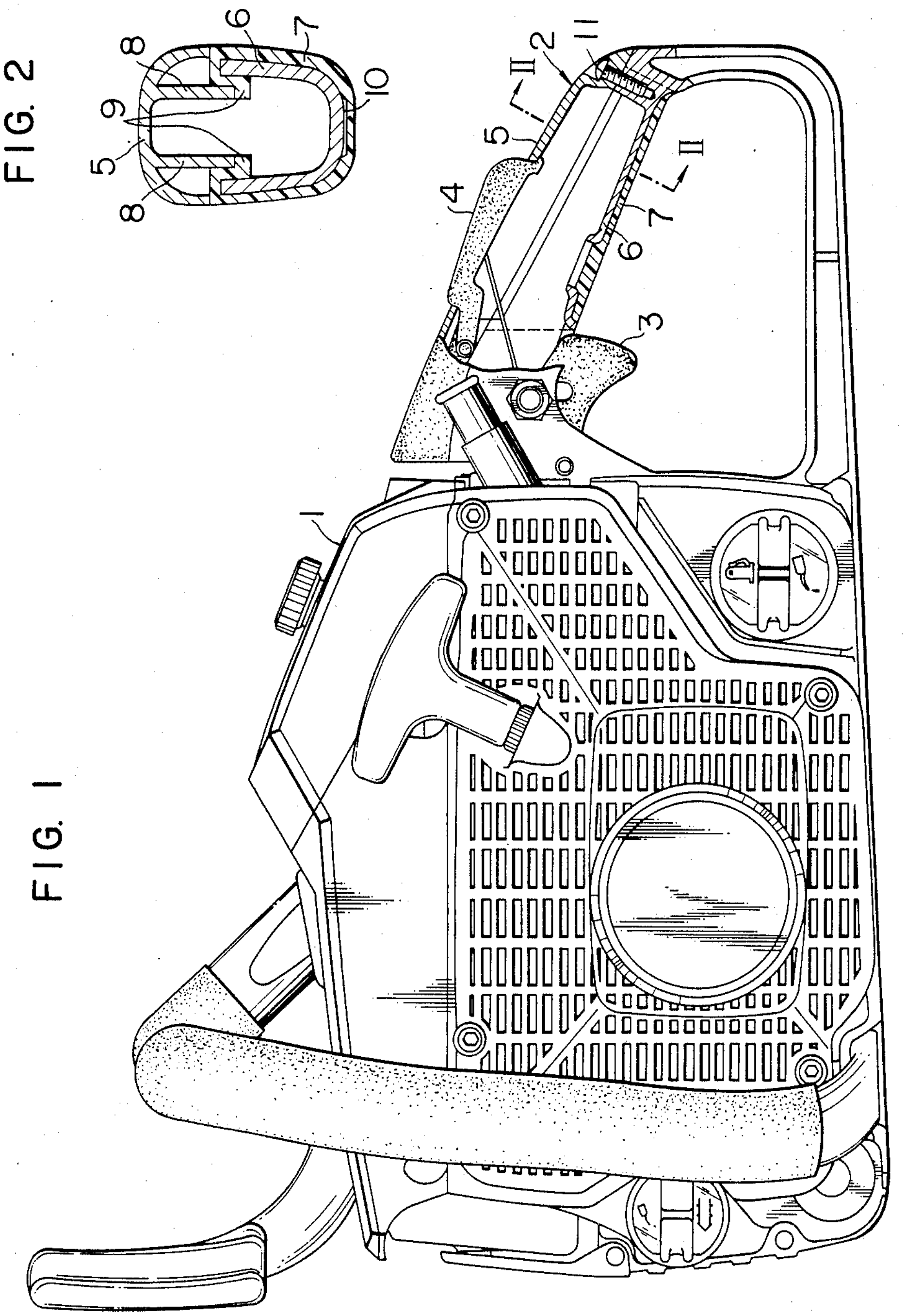
FIG. 1 is a fragmentary sectional view of a chain saw incorporating a handle in accordance with the invention.
FIG. 2 is an enlarged sectional view taken along the line II—II of FIG. 1.

A preferred embodiment of the invention will be described hereinunder with reference to the accompanying drawings.

Referring to FIG. 1, a chain saw provided with a handle in accordance with the invention has a known construction with an internal combustion engine as the power source.

The chain saw has a hollow rear handle 2 constructed in accordance with the invention. The handle 2 is equipped with a trigger 3 which is adapted to adjust the opening degree of a throttle valve of the engine to control the engine power, and a latch member 4 which disengageably latches the trigger 3 so as to prevent unintentional movement of the trigger 3.

As will be clearly seen from FIG. 2, the rear handle 2 is constituted by two parts: namely, an upper handle member 5 and a lower handle member 6 which are adjoined together to present the form of a handle. Both upper and lower handle members are made of a suitable material such as plastics. The lower handle member 6 is lined at its outer surface with an anti-slip rubber layer 7. The upper ends of the rubber layer 7 is folded back at its top end portion to cover the top end and the top inner brim portion of the lower handle member 6.

The lower ends of both outer side walls of the upper handle member 5 cooperate with the upper ends of corresponding side walls of the lower handle member 6 in clamping therebetween the folded portion of the rubber layer 7. The upper handle member 5 is provided with vertical downward projections 8 extending downwardly from the top thereof into contact with the steps 9 on the top inner brim portion of the rubber layer 7 so as to securely stretch the rubber layer 7 on the outer peripheral surface on the lower handle member 6.

In addition, a printed heater 10 as an electric heat generating body is clamped between the lower handle member 6 and the rubber layer 7 so as to extend in the longitudinal direction of the handles. The printed heater 10 is electrically connected to a generator (not shown) which is mounted on the chain saw and driven by the internal combustion engine. The generator, when driven by the internal combustion engine, supplies electric power to the printed heater 10 to suitably heat the rear handle 2 as a whole, thereby warming the user's hand while it grips the rear handle 2.

The upper and lower handle members 5 and 6 are secured to each other by screws 11 (only one of them is shown in FIG. 1) which are screwed into thread holes in the lower handle member 6 through holes formed in the upper handle member 5 at both longitudinal ends of the rear handle 2.

The upper and lower handle members 5, 6, rubber layer 7 and the printed heater 10 can be assembled together simply by screws 11 to complete the rear handle 2.

Although the invention has been described through specific terms, it is to be noted that the described embodiment is not exclusive and various changes and modifications are possible without departing from the scope of the invention which is limited solely by the appended claims.

What is claimed is:

1. A handle for a portable power-driven machine comprising: an upper half-shell handle member and a lower half-shell handle member which are adjoined to each other to present the form of a handle on a portable power-driven machine; and an anti-slip rubber layer lining the outer surface of said lower handle member, said rubber layer having an upper end folded back on the upper ends of both side walls of said lower handle member to overlie the upper inner periphery of said side walls, said upper handle member having vertical downward projections extending toward inside of said side walls which engage the folded end portions of said rubber layer overlying the upper inner periphery of said lower handle member; wherein said rubber layer is provided on the extremities thereof overlying said upper inner periphery of said lower handle member with steps which engage the lower ends of said vertical downward projections.

2. A handle according to claim 1, wherein said upper and lower handle members are adjoined to each other by means of screws.

3. A handle according to claim 1, further comprising a heat generating body interposed between said lower handle member and said rubber layer.

4. A handle for a portable power-driven machine comprising an upper half-shell handle member, and a lower half-shell handle member having side walls, which are adjoined to each other to present the form of a handle;

an anti-slip rubber layer lining the outer surface of said lower handle and its said side walls;

said rubber layer having upper ends folded back on the upper ends of both said side walls of said lower handle member to overlie the upper inner periphery of said side walls and forming substantially step formations at both said folded back upper ends of said rubber layer;

a heat generating body clamped between said lower handle member and said rubber layer;

said upper handle having vertical downward projections extnding toward the inside of said side walls which engage the folded back ends of said rubber layer overlying the upper inner periphery of said lower handle member at said step formations.

5. A handle for portable power-driven machine, comprising an upper half-shell elongated handle member and a lower half-shell elongated handle member which are joined along their lengths to each other to present the form of a handle on a portable power-driven machine;

said upper handle member being provided with internal downward projections and said lower handle member being provided with an anti-slip rubber layer covering the exterior thereof, said rubber layer having upper ends along the sides of the lower handle member which extend inwardly and then downwardly within the interior of said lower handle member to overly the upper inner periphery of the sidewalls of said lower handle member, said anti-slip rubber layer terminating at opposite sides of said lower handle member with a pair of facing inwardly projecting flanges, said internal downward projection of said upper handle member engaging said inwardly projecting flanges of said rubber layer to effect a stretching of said rubber layer upon the mating of said upper and lower handle members.

* * * * *